US011978957B2

(12) United States Patent
Wennergren et al.

(10) Patent No.: US 11,978,957 B2
(45) Date of Patent: May 7, 2024

(54) SCALABLE MODULAR ANTENNA ARRANGEMENT

(71) Applicant: GAPWAVES AB, Gothenburg (SE)

(72) Inventors: Anders Wennergren, Trollhättan (SE); Magnus Gustafsson, Alingsås (SE)

(73) Assignee: GAPWAVES AB, Gothenburg (SE)

( * ) Notice: Subject to any disclaimer, the term of this patent is extended or adjusted under 35 U.S.C. 154(b) by 117 days.

(21) Appl. No.: 17/796,435

(22) PCT Filed: Jan. 12, 2021

(86) PCT No.: PCT/EP2021/050433
§ 371 (c)(1),
(2) Date: Jul. 29, 2022

(87) PCT Pub. No.: WO2021/151648
PCT Pub. Date: Aug. 5, 2021

(65) Prior Publication Data
US 2023/0344144 A1 Oct. 26, 2023

(30) Foreign Application Priority Data
Jan. 31, 2020 (SE) .................................... 2030028-1

(51) Int. Cl.
*H01Q 15/00* (2006.01)
*H01Q 1/52* (2006.01)
(Continued)

(52) U.S. Cl.
CPC ........... *H01Q 15/006* (2013.01); *H01Q 1/526* (2013.01); *H01Q 15/141* (2013.01);
(Continued)

(58) Field of Classification Search
CPC .... H01Q 15/006; H01Q 1/526; H01Q 15/141; H01Q 21/0025; H01Q 21/005; H01Q 21/061; H01P 11/001
See application file for complete search history.

(56) References Cited

U.S. PATENT DOCUMENTS 7,348,932 B1 * 3/2008 Puzella .............. H01Q 21/0025
342/373
2006/0114165 A1 6/2006 Honda et al.
(Continued)

FOREIGN PATENT DOCUMENTS

EP 3132499 A2 2/2017
JP 2011103578 A 5/2011
(Continued)

OTHER PUBLICATIONS

International Search Report (PCT/ISA/210) and Written Opinion (PCT/ISA/237) dated Apr. 23, 2021, by the European Patent Office as the International Searching Authority for International Application No. PCT/EP2021/050433. (10 pages).
(Continued)

*Primary Examiner* — Daniel D Chang
(74) *Attorney, Agent, or Firm* — BUCHANAN, INGERSOLL & ROONEY PC

(57) ABSTRACT

An antenna arrangement having a stacked layered structure. The antenna arrangement includes a radiation layer including one or more radiation elements, and a distribution layer facing the radiation layer. The distribution layer is arranged to distribute a radio frequency signal to the one or more radiation elements. The distribution layer includes at least one distribution layer feed and a first electromagnetic bandgap, EBG, structure arranged to form at least one first waveguide intermediate the distribution layer and the radiation layer. The first EBG structure is also arranged to prevent electromagnetic propagation in a frequency band of opera-
(Continued)

tion from propagating from the at least one first waveguide in directions other than through the at least one distribution layer feed and the one or more radiation elements. The distribution layer includes a plurality of distribution modules and a positioning structure, the positioning structure is arranged to fix the distribution modules in position.

12 Claims, 9 Drawing Sheets

(51) Int. Cl.
*H01Q 15/14* (2006.01)
*H01Q 21/00* (2006.01)
*H01Q 21/06* (2006.01)

(52) U.S. Cl.
CPC ....... *H01Q 21/0025* (2013.01); *H01Q 21/005* (2013.01); *H01Q 21/061* (2013.01)

(56) References Cited

U.S. PATENT DOCUMENTS

2015/0303586 A1 10/2015 Hafenrichter et al.
2019/0109361 A1* 4/2019 Ichinose ................ H01P 3/123
2020/0185802 A1 6/2020 Vilenskiy et al.

FOREIGN PATENT DOCUMENTS

RU 2696676 C1 8/2019
WO 2004042864 A2 5/2004

OTHER PUBLICATIONS

Kildal et al., “Design and experimental verification of ridge gap waveguide in bed of nails for parallel-plate mode suppression”, IET Microwaves Antennas & Propagation, vol. 5, No. 3, Feb. 21, 2011, pp. 262-270, XP006037907.

* cited by examiner

SCALABLE MODULAR ANTENNA ARRANGEMENT

TECHNICAL FIELD

The present disclosure relates to antenna arrangements, particularly antenna arrays. The antenna arrangements are suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency (RF) signals, i.e. electromagnetic signals.

The radiation arrangement of a transceiver often comprises an antenna array, since an array allows high control of shaping the radiation pattern, e.g. for high directivity, beam steering, and/or multiple beams. An antenna array comprises a plurality of radiation elements that commonly are spaced less than a wavelength apart, where the wavelength corresponds to the operational frequency of the transceiver. Generally, the more radiation elements in the array, the better the control of the radiation pattern. The distribution network, or feed network, constitutes a large design and manufacturing challenge in antenna arrays, since physical space is often limited. The distribution network distributes one or more radio frequency signals to and from the plurality of radiation elements.

Distribution networks based on electromagnetic bandgap, EBG, structures generally present compact designs, low loss, low leakage, and forgiving manufacturing and assembling tolerances. However, as either or both of the number of radiation elements and the operational frequency increase, manufacturing tolerances for EBG structures start to become challenging. This problem is especially severe for antenna arrays at millimeter wave frequencies which may comprise over a hundred radiation elements.

SUMMARY

It is an object of the present disclosure to provide a new antenna arrangements which, among other things, offer high manufacturing yields through improved sensitivity to manufacturing tolerances, and at the same time offer high performance in terms of, e.g., losses, while allowing for an efficient and convenient assembly of the antenna arrangement.

This object is at least in part obtained by an antenna arrangement having a stacked layered structure. The antenna arrangement comprises a radiation layer comprising one or more radiation elements and a distribution layer facing the radiation layer. The distribution layer is arranged to distribute a radio frequency signal to the one or more radiation elements. The distribution layer comprises at least one distribution layer feed and a first electromagnetic bandgap, EBG, structure arranged to form at least one first waveguide intermediate the distribution layer and the radiation layer. The first EBG structure is also arranged to prevent electromagnetic propagation (i.e. electromagnetic radiation) in a frequency band of operation from propagating from the at least one first wave guide in directions other than through the at least one distribution layer feed and the one or more radiation elements. The distribution layer comprises a plurality of distribution modules and a positioning structure. The positioning structure is arranged to fix the distribution modules in position.

EBG structures allow compact designs, low loss, low leakage between adjacent waveguides, and forgiving manufacturing and assembling tolerances. Furthermore, there is no need for electrical contact between the radiation layer and the distribution layer. This is an advantage since high precision assembly is not necessary and since electrical contact need not be verified. However, as either or both of the number of radiation elements and the operational frequency increase, manufacturing tolerances for EBG structures start to become challenging. This problem is especially severe for antenna arrays at millimeter wave frequencies which may comprise over a hundred radiation elements. More specifically, the EBG element size decreases as the frequency increases and the number of EBG elements increases as the number of radiation elements increase. Thus, the yield can be low when mass producing such distribution layer. The more EBG elements and the smaller the size of the EBG elements, the worse the yield often is. The problem of low yield may at least partly be overcome by having the distribution layer comprising a plurality of distribution modules.

According to aspects, the positioning structure comprises a frame.

This way, the distribution modules may be securely held in position by the frame.

According to aspects, the frame comprises a plurality of frame modules.

Advantageously, the plurality of frame modules facilitates assembly of the antenna arrangement.

According to aspects, at least one of the one or more radiation elements comprises an aperture.

An aperture of the radiation layer may for example be a slot opening extending through the radiation layer. A radiation element comprising an aperture allows for a radiation layer with low loss and that is easy to manufacture.

According to aspects, the first EBG structure comprises a repetitive structure of protruding elements, and the distribution layer further comprises at least one waveguide ridge. Thereby, at least one first gap waveguide is formed intermediate the distribution layer and the radiation layer.

This allows for an EBG structure that is easy to manufacture and that provides low loss in the first waveguide and high attenuation of electromagnetic propagation (i.e. electromagnetic radiation) in a frequency band of operation propagating from the at least one first wave guide in directions other than through the at least one distribution layer feed and the one or more radiation elements.

According to aspects, the antenna arrangement further comprises a support layer facing the distribution layer. The support layer is arranged to support the positioning structure and/or the plurality of distribution modules.

This way, the radiation layer and the distribution layer may securely be fixed together According to aspects, the support layer comprises a printed circuit board, PCB, layer and a shield layer. The PCB layer comprises at least one PCB layer feed. The PCB layer faces the distribution layer and the shield layer faces the PCB layer.

The use of EBG structures in the distribution layer enables highly efficient coupling at the transitions from the PCB layer feeds 133 on the PCB layer 131 through distribution feeds 323 to the at least one first waveguide, which results in low loss.

According to aspects, the shield layer comprises a second EBG structure arranged to form at least one second waveguide intermediate the shield layer and the PCB layer. The second EBG structure is also arranged to prevent electromagnetic propagation (i.e. electromagnetic radiation) in a frequency band of operation from propagating from the at least one second wave guide in directions other than through the at least one PCB layer feed.

The second EBG structure allows a compact design with low loss and low leakage, i.e. unwanted electromagnetic propagation between, e.g., adjacent waveguides or between adjacent RFICs. Furthermore, the second EBG structure shields the PCB layer from electromagnetic radiation outside of the antenna arrangement.

According to aspects, the second EBG structure comprises a repetitive structure of protruding elements. The PCB layer comprises a ground plane and at least one planar transmission line. Thereby, at least one second gap waveguide is formed intermediate the shield layer and the PCB layer.

The advantages of an EBG structure comprising a repetitive structure of protruding elements is discussed above.

According to aspects, the radiation layer comprises a plurality of radiation modules.

This way, the yield of manufacturing the radiation layer might improve. The radiation modules can optionally be size matched to the distribution modules, which may facilitate assembly of the antenna arrangement According to aspects, the PCB layer comprises a plurality of PCB modules.

According to aspects, the shield layer comprises a plurality of shield modules.

This way, all modules can be size matched to the distribution modules. This may improve the yield and may facilitate assembly of the antenna arrangement.

According to aspects, a telecommunication or radar transceiver comprising the antenna arrangement.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
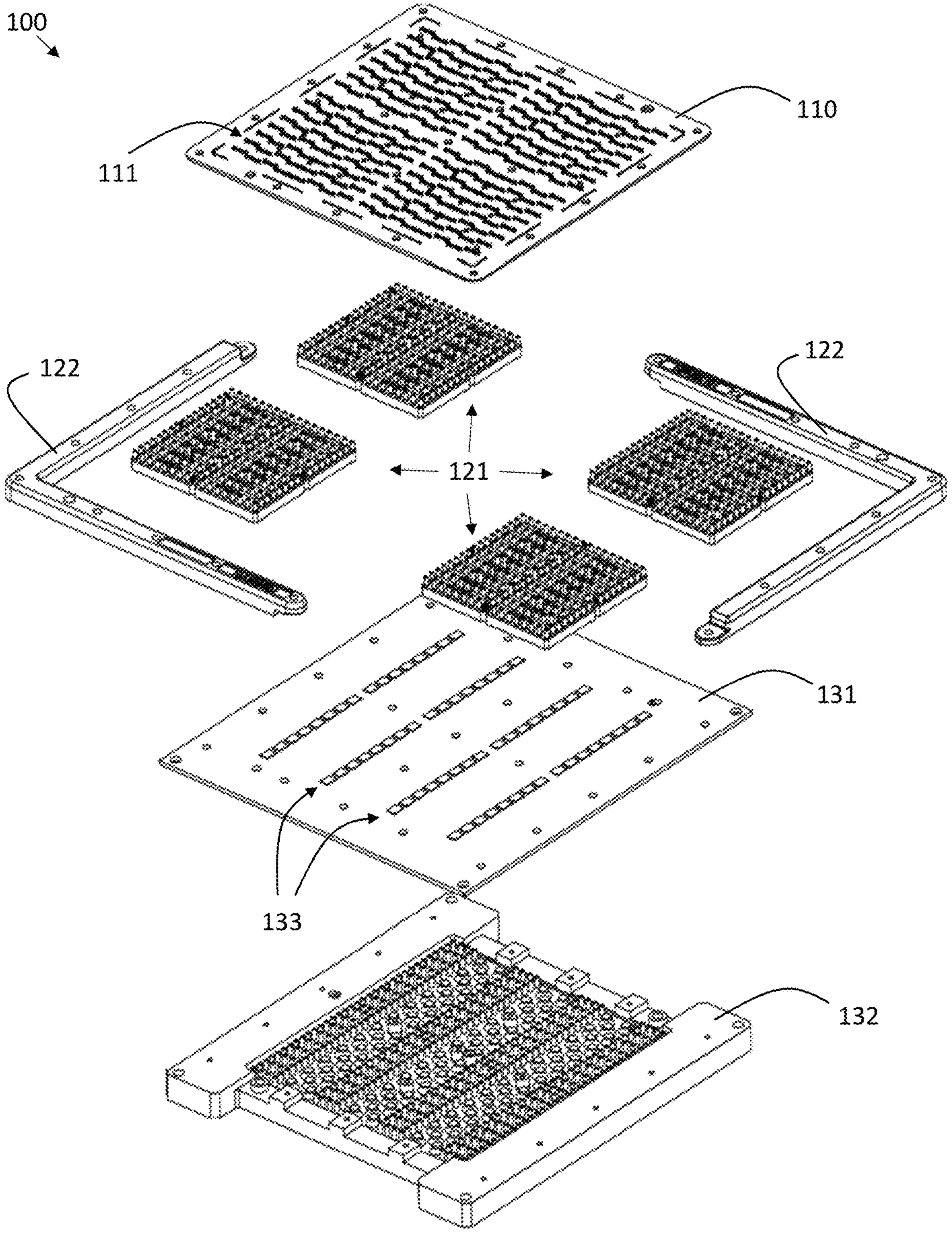
FIG. 1A is an exploded view of an example antenna arrangement, FIG. 1B schematically illustrates an exploded side view of an example antenna arrangement.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1B:
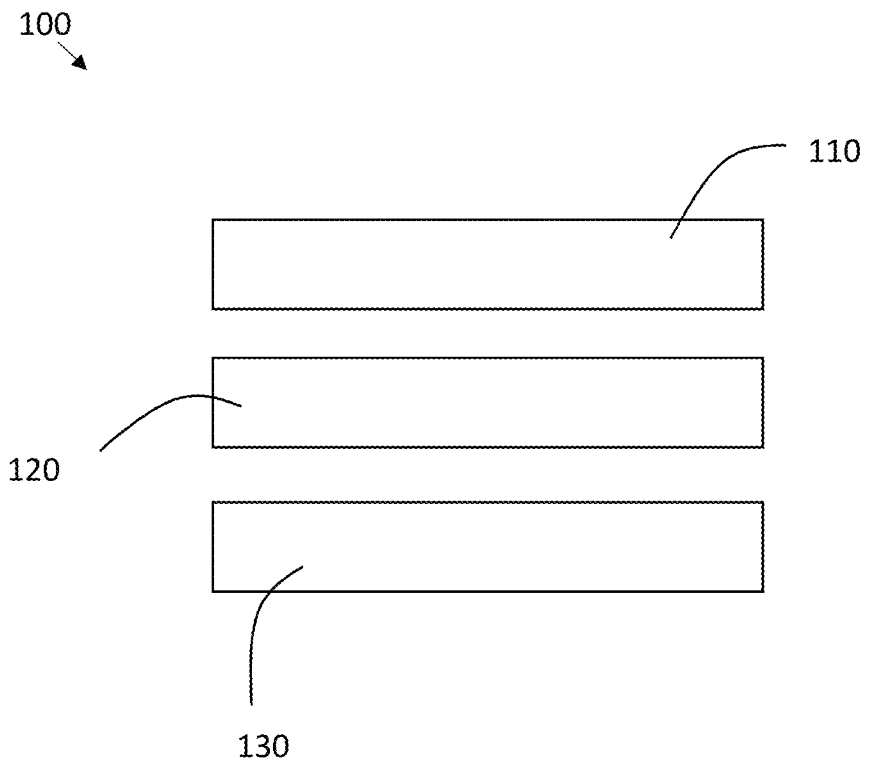

There are disclosed herein various types of antenna arrangements. FIGS. 1A and 1B show antenna arrangements having a stacked layered structure. A stacked layered structure is a structure comprising a plurality of planar elements referred to as layers. Each planar element has two sides, or faces, and is associated with a thickness. The thickness is much smaller than the dimension of the faces, i.e., the layer is a flat or approximately planar element.

According to some aspects, a layer is rectangular or square. However, more general shapes are also applicable, including circular or elliptical disc shapes. The stacked layered structure is stacked in the sense that layers are arranged on top of each other. In other words, the layered structure can be seen as a sandwich structure.

The antenna arrangement in FIG. 1A comprises a radiation layer 110 with a plurality of radiation elements 111. In the example antenna arrangement in FIG. 1, the radiation elements are slot antennas. A slot antenna is an example of an aperture. In general, a distribution layer 120 (shown in FIG. 1B) distributes one or more radio frequency signals to and from one or more radiation elements in the plurality of radiation elements.

The distribution layer 120 can be based on electromagnetic bandgap, EBG, structures, which present compact designs, low loss, low leakage, and forgiving manufacturing and assembling tolerances. However, as either or both of the number of radiation elements and the operational frequency increase, manufacturing tolerances for EBG structures start to become challenging. This problem is especially severe for antenna arrays at millimeter wave frequencies which may comprise over a hundred radiation elements.

EBG structures in the antenna arrangement are arranged to form at least one waveguide intermediate two layers. EBG structures are also arranged to prevent electromagnetic propagation (i.e. electromagnetic radiation) in a frequency band of operation from propagating along the layers except through the at least one wave guide. Thus, EBG structures may be arranged to prevent unwanted electromagnetic propagated between adjacent waveguides. The at least one waveguide couples the electromagnetic signal in the band of operation to one or more feeds and/or to one or more radiation elements. EBG structures prevent propagation by attenuation. Herein, to attenuate is interpreted as to significantly reduce an amplitude or power of electromagnetic radiation, such as a radio frequency signal. The attenuation is preferably complete, in which case attenuate and block are equivalent, but it is appreciated that such complete attenuation is not always possible to achieve. EBG structures form a surface that acts a magnetic conductor. If the magnetically conductive surface faces an electrically conductive surface, and if the two surfaces are arranged at a distance less than a quarter of a center frequency, no electromagnetic waves in the frequency band of operation can, in the ideal case, propagate along the intermediate surfaces, since all parallel plate modes are cut-off in that frequency band. The center frequency is in the middle of the frequency band of operation. In a realistic scenario, the electromagnetic waves in the frequency band of operation are attenuated per length along the intermediate surfaces.

There exists a multitude of EBG structures. The EBG elements of the EBG structure are arranged in a periodic or quasi-periodic pattern in one, two or three dimensions, as will be discussed in more detail below in connection to FIGS. 7A-D. Herein, a quasi-periodic pattern is interpreted to mean a pattern that is locally periodic but displays no long-range order. A quasi-periodic pattern may be realized in one, two or three dimensions. As an example, a quasi-periodic pattern can be periodic at length scales below ten times an EBG element spacing, but not at length scales over 100 times the EBG element spacing.

An EBG structure may comprise at least two EBG element types, the first type of EBG element comprising an electrically conductive material and the second type of EBG element comprising an electrically insulating material. EBG elements of the first type may be made from a metal such as copper or aluminum, or from a non-conductive material like PTFE or FR-4 coated with a thin layer of an electrically conductive material like gold or copper. EBG elements of the first type may also be made from a material with an electric conductivity comparable to that of a metal, such as a carbon nanostructure or electrically conductive polymer. As an example, the electric conductivity of EBG elements of the first type can be above $10^3$ Siemens per meter (S/m). Preferably, the electric conductivity of EBG elements of the first type is above $10^5$ S/m. In other words, the electric conductivity of EBG elements of the first type is high enough that the electromagnetic radiation can induce currents in the EBG elements of the first type, and the electric conductivity of EBG elements of the second type is low enough that no currents can be induced in EBG elements of the second type. EBG elements of the second type may optionally be non-conductive polymers, vacuum, or air. Examples of such non-conductive EBG element types also comprise FR-4 PCB material, PTFE, plastic, rubber, and silicon.

Figure 7A:
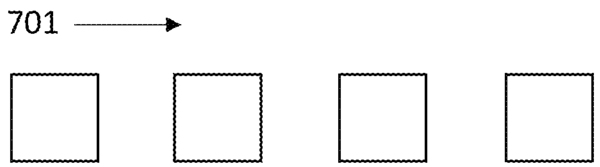
FIGS. 7A, 7B, 7C, and 7D show example symmetry patterns.
Figure 7B:
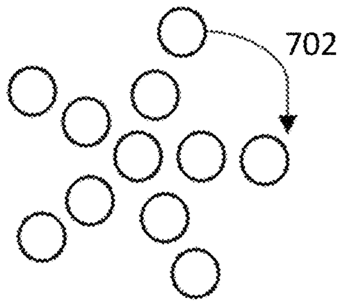
Figure 7C:
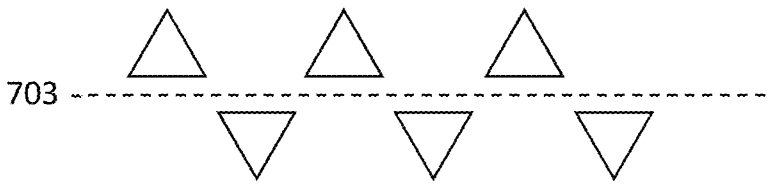
Figure 7D:
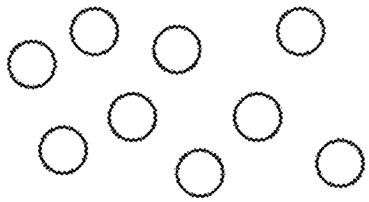

Referring to FIGS. 7A-D, EBG elements of the first and second type may be arranged in a pattern characterized by any of translational (701 in FIG. 7A), rotational (702 in FIG. 7B), or glide symmetry (see the symmetry line 703 in FIG. 7C), or a periodic, quasi-periodic or irregular pattern (see FIG. 7D).

The physical properties of the EBG elements of the second type also determines the dimensions required to obtain attenuation of electromagnetic propagation past the EBG structure. Thus, if the second type of material is chosen to be differently from air, the required dimensions of the first type of EBG element changes. Consequently, a reduced size antenna array can be obtained by varying the choice of material for the first and the second type of element. Advantageously, a reduced size antenna array may be obtained from such a choice.

The EBG elements of the first type may be arranged in a periodic pattern with some spacing. The spaces between the EBG elements of the first type constitute the elements of the second type. In other words, the EBG elements of the first type are interleaved with EBG elements of the second type. Interleaving of the EBG elements of the first and second type can be achieved in one, two or three dimensions.

A size of the EBG elements of either the first or the second type, or both, is smaller than the wavelength in air of electromagnetic radiation in the frequency band. As an example, defining the center frequency as the frequency in the middle of the frequency band, the EBG element size is between 1/5th and 1/50th of the wavelength in air of electromagnetic radiation at the center frequency. Here, the EBG element size is interpreted as the size of an EBG element in a direction where the electromagnetic waves are attenuated, e.g. along a surface that acts as a magnetic conductor. As an example, for an EBG element comprising a vertical rod with a circular cross-section and with electromagnetic radiation propagating in the horizontal plane, the size of the EBG element corresponds to a length or diameter of the cross-section of the rod.

Figure 6A:
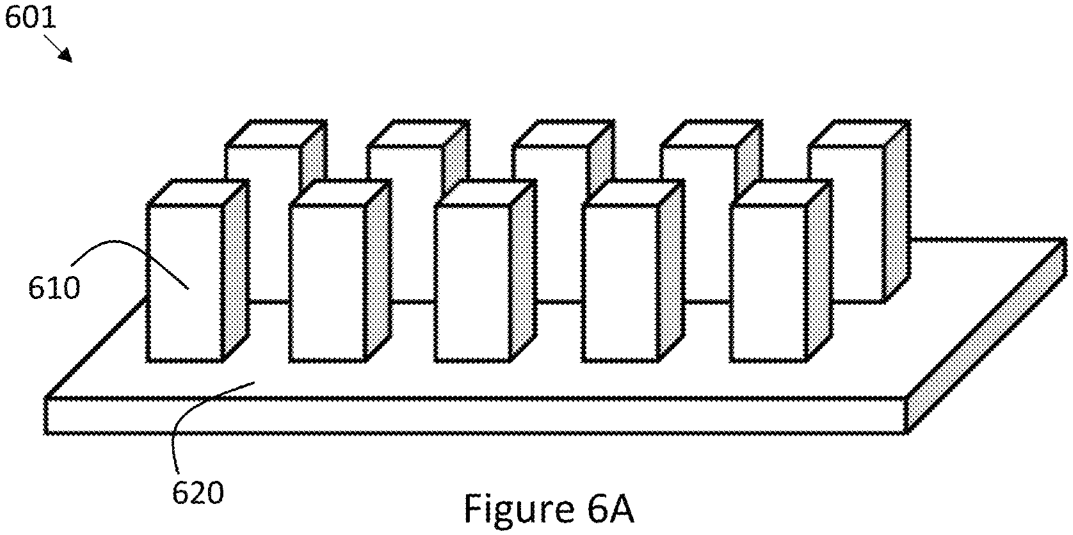
FIGS. 6A, 6B, and 6C show examples of electromagnetic bandgap structures.
Figure 6B:
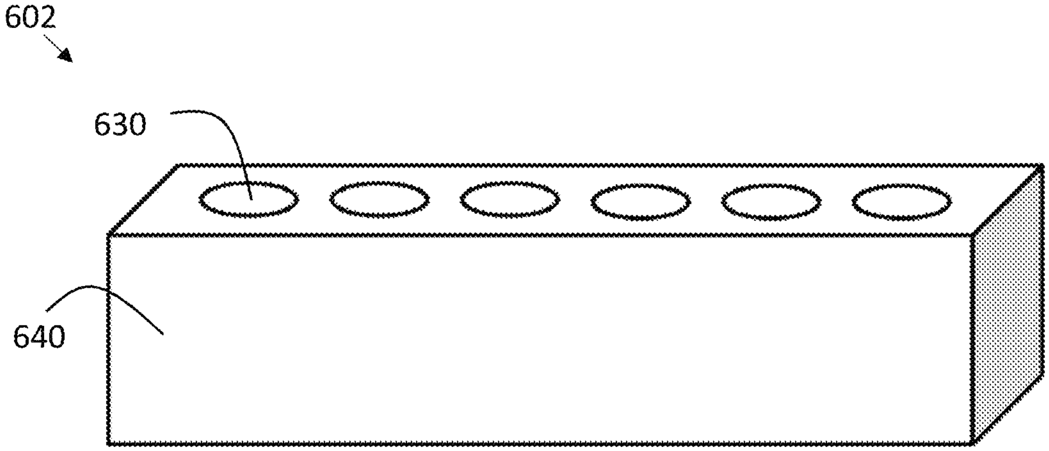
Figure 6C:
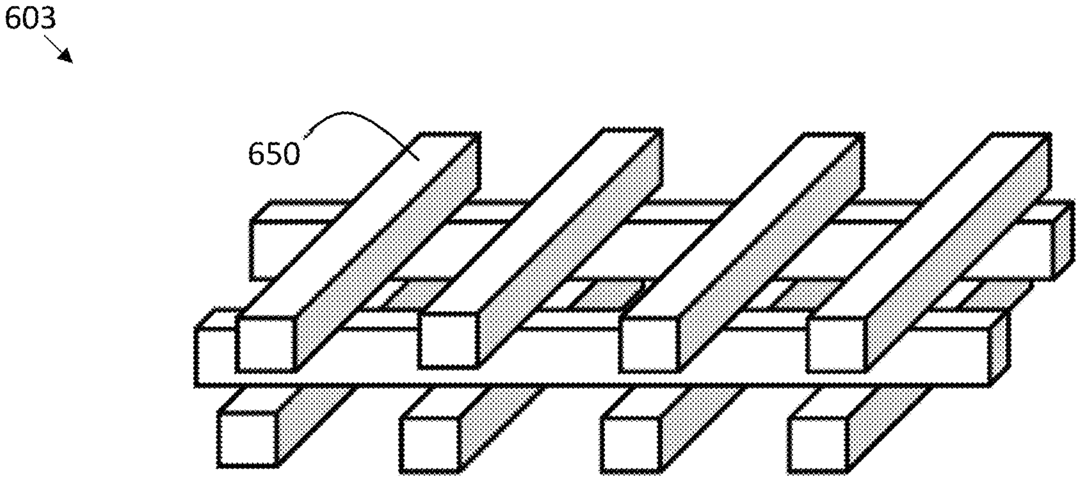

FIGS. 6A, 6B and 6C show examples of how EBG elements of the first and second type may be arranged in an EBG structure. A type of EBG structure 601, shown in FIG. 6A, comprises electrically conductive protrusions 610 on an electrically conductive substrate 620. The protrusions 610 may optionally be encased in a dielectric material. In the example of FIG. 6A, the electrically conductive protrusions constitute the EBG elements of the first type, and the spaces in-between the protrusions, optionally filled with a non-conductive material, constitute the EBG elements of the second type. It is appreciated that the protrusions 610 may be formed in different shapes. FIG. 6A shows an example where the protrusions have a square cross-section, but the protrusions may also be formed with a circular, elliptical, rectangular, or more generally shaped cross-section shape.

It is also possible that the protrusions are mushroom shaped, as in, e.g. a cylindrical rod on an electrically conductive substrate with a flat electrically conductive circle on top of the rod, wherein the circle has a cross section larger than the cross section of the rod, but small enough to leave space for the second EBG element type between the circles in the EBG structures. Such mushroom-shaped protrusion may be formed in a PCB, wherein the rod comprises a via hole, which may or may not be filled with electrically conductive material.

The protrusions have a length in a direction facing away from the electrically conductive substrate. In general, if the EBG element of the second type is air, the protrusion length corresponds to a quarter of the wavelength in air at the center frequency. The surface along the tops of the protrusions is then close to a perfect magnetic conductor at the center frequency. Even though the protrusions are only a quarter wavelength long at a single frequency, this type of EBG structure still presents a band of frequencies where electromagnetic waves may be attenuated, when the EBG structure faces an electrically conductive surface. In a non-limiting example, the center frequency is 15 GHz and electromagnetic waves in the frequency band 10 to 20 GHz propagating intermediate the EBG structure and the electrically conductive surface are attenuated.

As another example, a type of EBG structure 602 shown in FIG. 6B consists of a single slab of electrically conductive material 640 into which cavities 630 have been introduced. The cavities may be air-filled or filled with a non-conductive material. It is appreciated that the cavities may be formed in different shapes. FIG. 6B shows an example where elliptical cross-section holes have been formed, but the holes may also be formed with circular, rectangular, or more general cross-section shapes. In the example of FIG. 6B, the slab 640 constitutes the EBG elements of the first type, and the holes 630 constitute the EBG elements of the second type. In general, the length (in a direction facing away from the electrically conductive substrate) corresponding to a quarter of the wavelength at the center frequency.

FIG. 6C schematically illustrates a third exemplary type of EBG structure 603 consisting of extended electrically conductive EBG elements 650, optionally rods or slabs, stacked in multiple layers with the rods in a layer arranged at an angle to the rods in a previous layer. In the example of FIG. 6C, the rods constitute EBG elements of the first type and the spaces in between constitutes EBG elements of the second type. The example of FIG. 6C shows an EBG structure where interleaving of EBG elements of the first and second type is achieved in three dimensions.

As mentioned above, manufacturing tolerances for EBG structures become challenging as either or both of the number of radiation elements and the operational frequency increase for stacked layer antenna arrangements wherein the distribution layer is based on EBG structures. More specifically, the EBG element size decreases as the frequency increases and the number of EBG elements increases as the number of radiation elements increase. As an example, there is a non-negligible probability of manufacturing defects of one or more of the EBG elements in the EBG structure when manufacturing a distribution layer for a 16×16 radiation element antenna array (i.e. a total of 256 radiation elements) for an operational frequency of 30 GHz. Thus, the yield can be low when mass producing such distribution layer. The more EBG elements and the smaller the size of the EBG elements, the worse the yield often is.

The problem of low yield may at least partly be overcome by having the distribution layer comprising a plurality of distribution modules. In the example of FIG. 1A, the distribution layer 120 for a 16×16 radiation element antenna array comprises four distribution modules 121. Each of the four modules is arranged to distribute one or more radio frequency signals to and from one or more radiation elements 111 in a subset of radiation elements. In the example of FIG. 1, the radiation elements comprise apertures and the subset of apertures comprises 8×8 apertures. If, for example, the yield is an exponentially decreasing function of the number of radiation elements, manufacturing four distribution modules 121—for 8×8 radiation elements each—provides a better yield compared to manufacturing a single distribution layer—for 16×16 radiation elements.

There is, in other words, herein a disclosed antenna arrangement 100 with a stacked layered structure. The antenna arrangement comprises a radiation layer 110 with one or more radiation elements 111, and a distribution layer 120 facing the radiation layer 110. The distribution layer 120 is arranged to distribute a radio frequency signal to the one or more radiation elements 111. The distribution layer 120 comprises at least one distribution layer feed 323 and a first electromagnetic bandgap, EBG, structure 324 arranged to form at least one first waveguide intermediate the distribution layer 120 and the radiation layer 110. The first EBG structure is also arranged to prevent electromagnetic propagation (i.e. electromagnetic radiation) in a frequency band of operation from propagating from the at least one first wave guide in directions other than through the at least one distribution layer feed 323 and the one or more radiation elements 111. The distribution layer comprises a plurality of distribution modules 121 and a positioning structure 122, wherein the positioning structure 122 is arranged to fix the distribution modules 121 in position. The distribution layer 120 is arranged with direct contact to the radiation layer 100 or is arranged at a distance from the radiation layer 110, where the distance is smaller than a quarter of a wavelength of center frequency of operation of the antenna arrangement 100.

The use of EBG structures in the distribution layer provides low losses from the waveguides as well as low interference between radio frequency signals in adjacent waveguides. A consequence of this is that a higher signal to noise ratio can be maintained due to the use and placement of EBG structures in the distribution layer, which is advantageous. Another advantage is that there is no need for electrical contact between the two layers constituting the waveguide. This is an advantage since high precision assembly is not necessary since electrical contact need not be verified.

The positioning structure 122 optionally comprises a frame. This way, the distribution modules 121 may be securely held in position by the frame. The frame may hold the distribution layers in position by alignment taps, fastening means, or the like. Fastening means can be, e.g., bolts, screws, rivets, heat staking, glue, or the like. It is also possible that the frame holds the distribution modules in position without any alignment taps, fastening means, or the like. Optionally, the radiation layer is also held in position by the frame. Alternatively, or in combination of, the distribution modules 121 and radiation layer 110 are attached together. Thus, the radiation layer may constitute the positioning structure 122.

In an example embodiment of the antenna arrangement 100, the frame 122 comprises a plurality of frame modules. In the example of FIG. 1A, the frame comprises two frame modules. Advantageously, the plurality of frame modules facilitates assembly of the antenna arrangement.

The frame 122 is arranged to mate with distribution modules around a perimeter of the antenna arrangement 100. The frame preferably fits the modules snugly in position. This way, the modules are fixed with minimal play. This is an advantage since eventual play would degrade the performance of the antenna arrangement, in terms of, i.a., losses and signal fidelity.

In the example embodiment of FIG. 1A, the distribution modules 121 are arranged to be fixed in a common plane by the frame 122. This way, all distribution modules are arranged snugly against the radiation layer 110 or at the same distance from the radiation layer. Preferably, the distribution modules are equally shaped, i.e. all of them are interchangeable in the antenna arrangement 100. This is an advantage from a manufacturing point of view since only one type of distribution module is required. The distribution modules may be shaped such that the total size of the antenna arrangement can be scaled. Examples of different scaling are arranging an array of 2 by 2 distribution modules or an array of 1 by 3 distribution modules.

The distribution modules 121 preferably leave no gaps or minimal gaps between each other when arranged in position in the antenna arrangement. This way, it is possible to form a joint EBG structure in the distribution layer. Alternatively, the frame 122 is arranged to fill gaps between the distribution modules. No gaps between the distribution modules allows only the radio frequency signal in the frequency band of operation to pass through the distribution layer—through at least one first waveguide and the at least one distribution layer feed 323.

Example dimensions of a rectangular distribution module are a thickness of 5 mm and sides 50 mm and 50 mm. The distribution modules are, however, not necessarily rectangular—other shapes are also possible, such as circular sectors to form a disc shaped or hexagonal shaped modules. It is also possible that the distribution layer modules have jigsaw puzzle shapes.

The distribution modules may comprise metal, such as copper or brass, that has been casted, molded and/or machined. The metal may comprise a coating with high electrical conductivity, e.g. aluminum coated with silver or copper or zinc coated with silver or copper. It is also possible that each distribution module is metalized on a scaffold structure comprising, e.g., plastic.

At least one of the one or more radiation elements 111 in the disclosed antenna arrangement 100 may comprise an aperture. An aperture of the radiation layer 110 may for example be a slot opening extending through the radiation layer. The slot opening is preferably rectangular, although other shapes such as square, round, or more general shapes are also possible. The slot openings are preferably small compared to the size of the radiation layer 110 and arranged in parallel lines on the radiation layer, although other arrangements are possible. If all radiation elements comprise slots, the radiation layer 110 may, e.g., comprise a metal sheet (of e.g. copper). Another example of a radiating element is a bowtie antenna. As a third example, a radiating element may be a patch antenna. Advantageously, both bowtie and patch antennas are easy to manufacture. If all radiation elements comprise patch antennas, the radiation layer 110 may, e.g., comprise a PCB with a ground plane, where the ground plane is facing the distribution layer. It is understood that other types of radiation elements are also possible.

Figure 2:
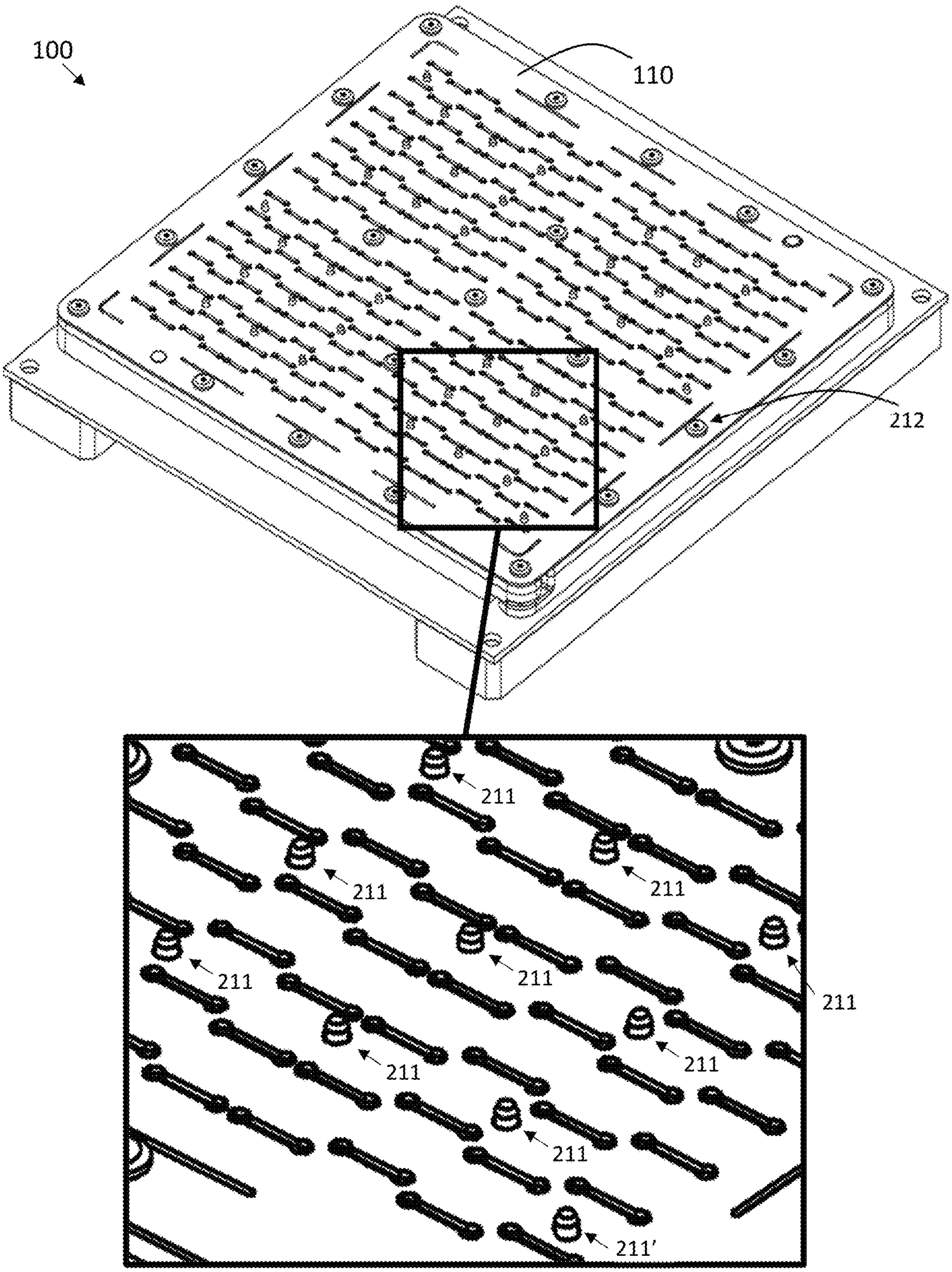
FIG. 2 illustrates an assembled example antenna arrangement.

FIG. 2 shows details of an assembled example antenna arrangement 100. Each distribution module 121 optionally comprises one or more alignment members 211. The one or more alignment members are arranged to align the module with respect to the other modules and with respect to the radiation elements 111. The one or more alignment members on the distribution modules 121 are arranged to mate with one or more corresponding alignment members. An alignment member and a corresponding alignment member may, e.g., be a pin and a hole. The one or more corresponding alignment members may be arranged on: adjacent distribution modules; the radiation layer 110; the frame 122; and/or on an optional support layer 130 arranged facing the distribution layer 120. According to aspects, one or more of alignment members are edge alignment members 211'. The one or more edge alignment members are arranged such that each distribution module 121 can only be assembled to the radiation layer 110 in a single and correct orientation. In other words, the one or more edge alignment members make the distribution modules rotationally asymmetric (in the plane extending along the distribution layer). This is an advantage in the assembling of the antenna arrangement 100. It is noted that the alignment members may constitute part of the positioning structure.

Figure 3A:
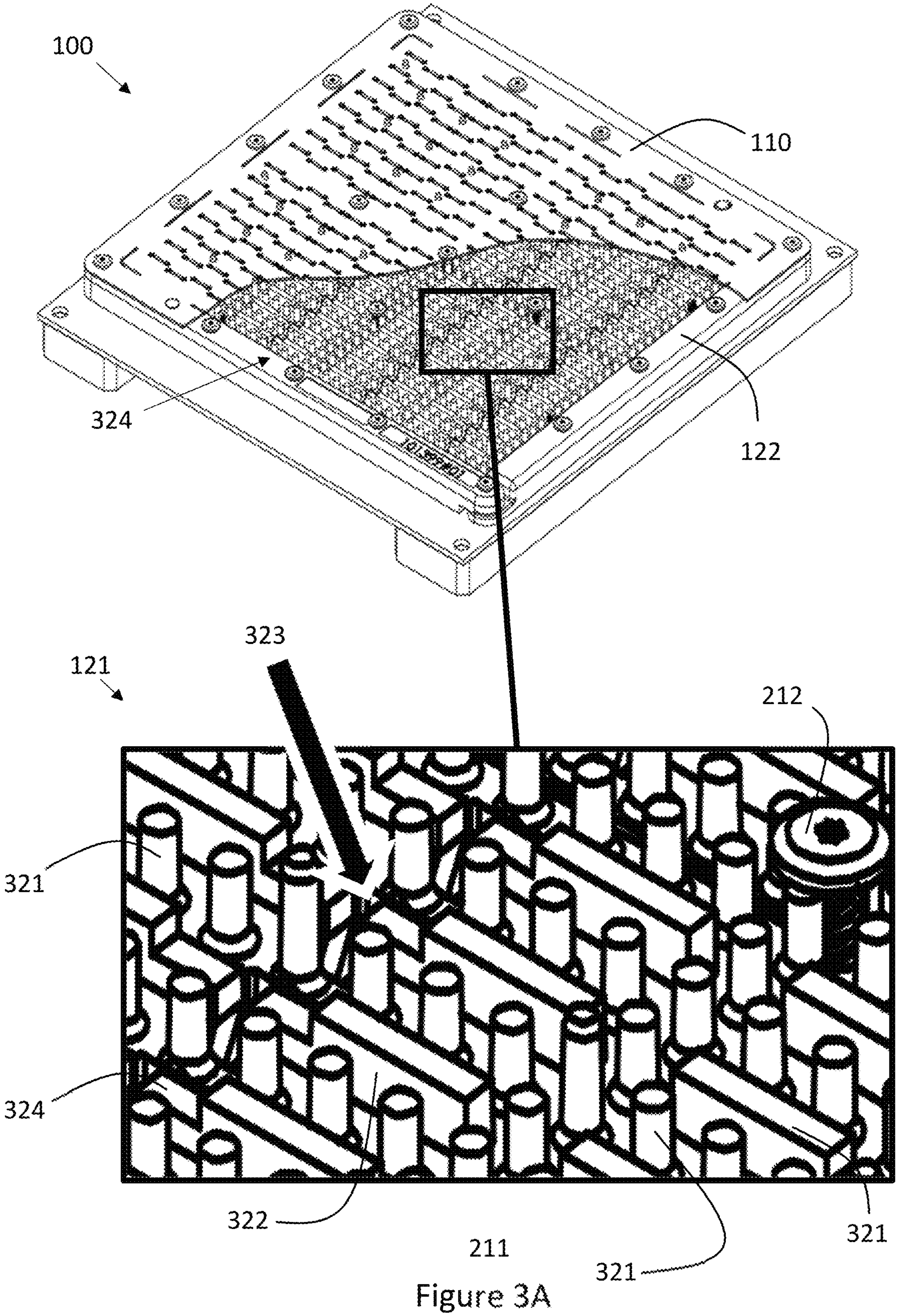
FIG. 3A illustrates a distribution layer inside an assembled example antenna arrangement.
Figure 3B:
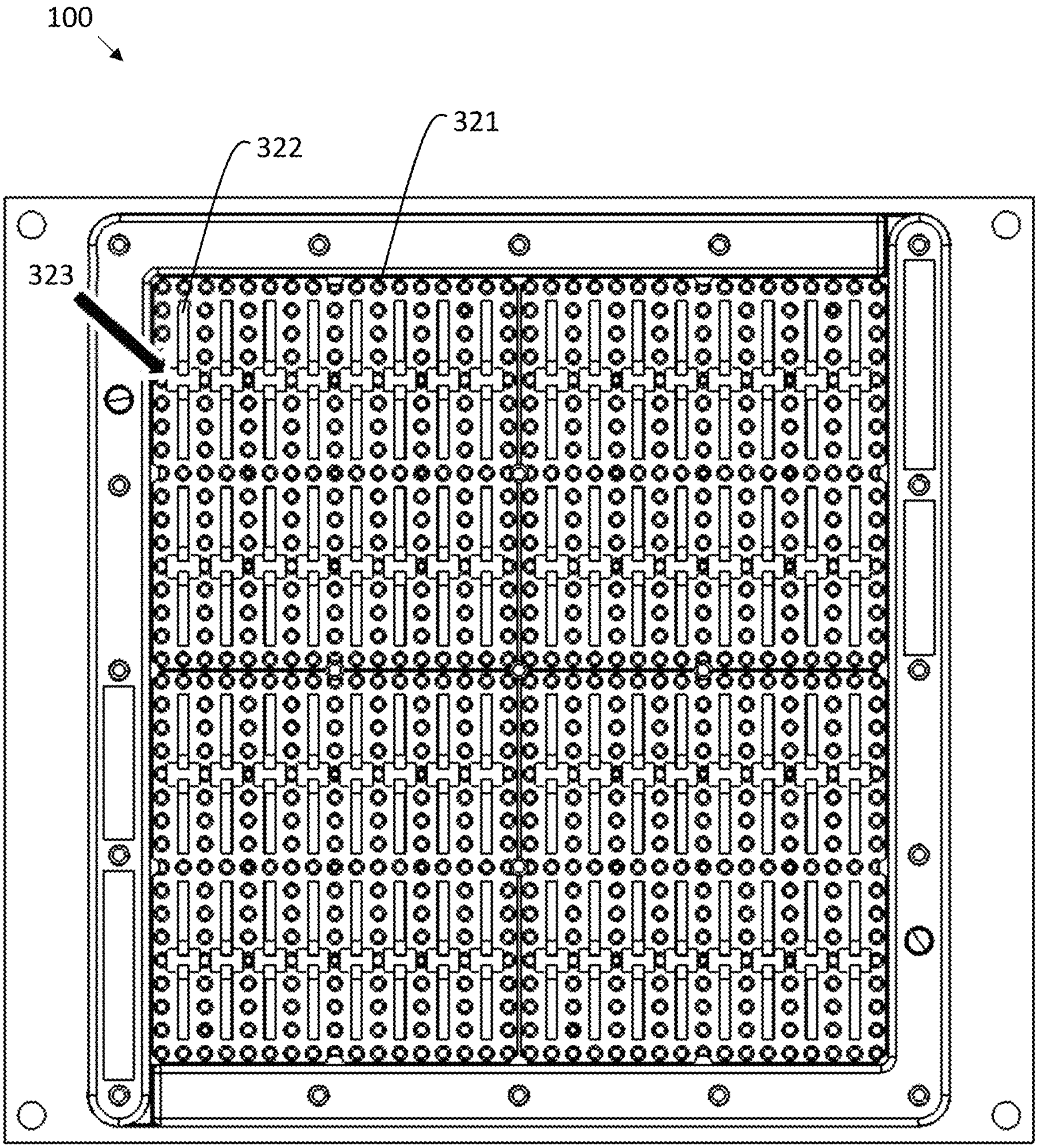
FIG. 3B illustrates a top view of a distribution layer inside an assembled example antenna arrangement.

FIGS. 3A and 3B show details of the distribution layer 120 in an assembled example antenna arrangement 100. The first EBG structure 324 optionally comprises a repetitive structure of protruding elements 321. The distribution layer 120 optionally comprises at least one waveguide ridge 322, thereby forming at least one first gap waveguide intermediate the distribution layer 120 and the radiation layer 110. Details regarding EBG structures comprising protrusions is discussed above in relation to FIG. 6A. Further displayed in FIG. 3 are distribution feeds 323, which are arranged adjacent to the waveguide ridges 322. In this example antenna arrangement, ridge coupling transitions 324 are arranged intermediate the distribution feeds 323 and the waveguide ridges 322.

As show in FIG. 1B, the antenna arrangement 100 optionally comprises a support layer 130 facing the distribution layer 120. The support layer 130 is arranged to support the positioning structure 122 and/or the plurality of distribution modules 121. This way, the radiation layer and the distribution layer may securely be fixed together. Referring to FIGS. 2 and 3, the radiation layer may be attached to the frame and/or to the distribution layer by one or more bolts 212 (or the like). Alternatively, or in combination of, the one or more bolts may pass through the frame and/or through the distribution layer through respective holes, and the one or more bolts are attached to the support layer. In the example of FIGS. 1 and 2, there are bolts intermediate the plurality of distribution modules, which cause a spacing between the subset of radiation elements that is larger than the spacing between the radiation elements within the subset of radiation elements. The spacing between the subset of radiation elements may have a negligible effect on sidelobe levels in the radiation pattern. Each of the four distribution modules 121 is arranged to distribute one or more radio frequency signals to and from one or more radiation elements 111 in the respective subset of radiation elements. In the example of FIG. 1, the subset of radiation elements comprises 8×8 radiation elements. Preferably, but not necessarily, the antenna arrangement comprise bolts intermediate the plurality of distribution modules, since that may fit the layers and plurality of distributions modules securely together.

As show in FIG. 1A, the support layer 130 optionally comprises a printed circuit board, PCB, layer 131 and a shield layer 132. The PCB layer comprises at least one PCB layer feed 133. The PCB layer in FIG. 1A faces the distribution layer 120 and the shield layer 132 faces the PCB layer.

The use of EBG structures in the distribution layer enables highly efficient coupling at the transitions from the PCB layer feeds 133 on the PCB layer 131 through distribution feeds 323 to the at least one first waveguide, which results in low loss.

The PCB layer 131 optionally comprises at least one RF integrated circuit (IC) arranged on either or both sides of the PCB layer. The at least one PCB layer feed 133 may be arranged to transfer radio frequency signals from the RF IC(s) to an opposite side of the PCB, into the distribution layer. According to an example, the at least one PCB layer feed 133 is a through hole connected to a corresponding opening in the distribution layer 120, wherein the through hole is fed by at least one microstrip line. Alternatively, or in combination of, the at least one PCB layer feed 133 may be arranged to transfer radio frequency signals from RF IC(s) on the side of the PCB facing the distribution layer into the distribution layer. According to aspects, at least one PCB layer feed 133 is arranged to transfer radio frequency signals away the antenna arrangement 100, to, e.g., a modem.

Figure 4:
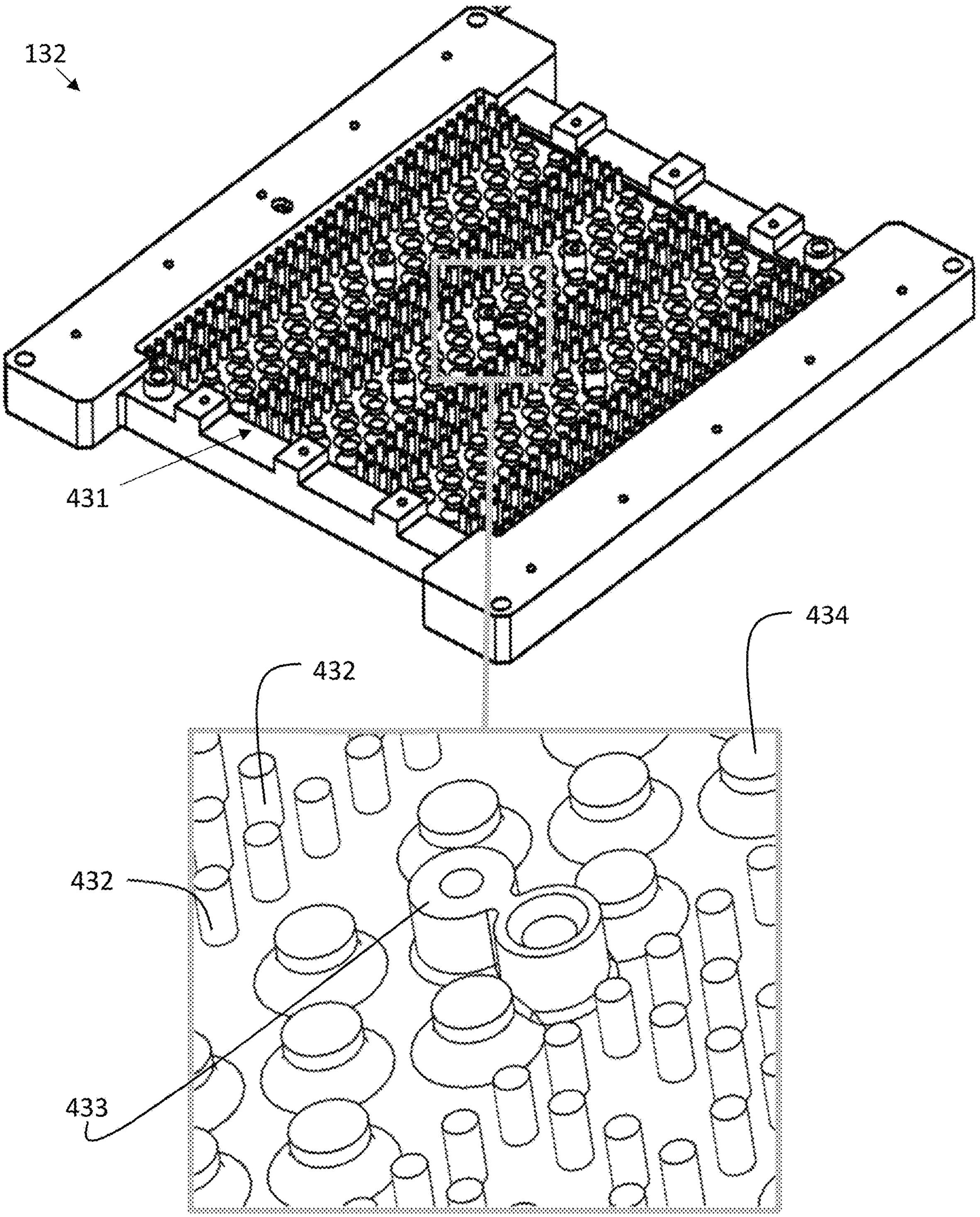
FIG. 4 illustrates an example shield layer.

FIG. 4 shows details of an example shield layer 132. The shield layer 132 optionally comprises a second EBG structure 431 arranged to form at least one second waveguide intermediate the shield layer 132 and the PCB layer 131. The second EBG structure is also arranged to prevent electromagnetic propagation (i.e. electromagnetic radiation) in a frequency band of operation from propagating from the at least one second wave guide in directions other than through the at least one PCB layer feed 133. The second EBG structure allows a compact design with low loss and low leakage, i.e. unwanted electromagnetic propagation between, e.g., adjacent waveguides or between adjacent RFICs. Furthermore, the second EBG structure shields the PCB layer from electromagnetic radiation outside of the antenna arrangement.

The second EBG structure 431 optionally comprises a repetitive structure of protruding elements 432,434, and the PCB layer optionally comprises a ground plane and at least one planar transmission line, thereby forming at least one second gap waveguide intermediate the shield layer 132 and the PCB layer 131. The at least one second gap waveguide may, e.g., be an inverted microstrip gap waveguide. The example shield layer of FIG. 4 comprises two types of protruding elements 432,434. The narrow and tall pins 432 are examples of the protruding pins discussed above in relation to FIG. 6A. The wider and shorter pins 434 are similar to the pins 432, except that they are adapted to fit RFICs between the shield layer and the PCB layer. The pins 434 may contact RFICs for heat transfer purposes. FIG. 4 also shows screw mounting pins 433.

According to aspects, the distribution layer 120 comprises a third EBG structure, which is arranged on the opposite side of the first EBG structure 324, i.e. the third EBG structure faces the support layer 130. This way, gap waveguides may be formed intermediate the distribution layer 120 and the support layer 130. These gap waveguides may be used for coupling electromagnetic signals between RFICs on the PCB layer 131 and the PCB layer feeds 133. The third EBG structure allows a compact design with low loss and low leakage, i.e. unwanted electromagnetic propagation between, e.g., adjacent waveguides or between adjacent RFICs. Furthermore, the third EBG structure shields the PCB layer from electromagnetic radiation outside of the antenna arrangement. The third EBG structure may comprise different pins similar to the pins of the second EBG structure in FIG. 4.

The radiation layer 110 optionally comprises a plurality of radiation modules. This way, the yield of manufacturing the radiation layer might improve. The radiation modules can optionally be size matched to the distribution modules, which may facilitate assembly of the antenna arrangement. For example, in a 16×16 antenna array, a distribution module arranged to distribute radio signals to 8×8 radiation elements can be matched with a radiation module comprising 8×8 radiation elements. The radiation modules may be attached to the distribution layer and/or to the optional shield layer by bolts or the like. Alternatively, or in combination of, the frame 122 can be arranged to fix both the distribution modules and the radiation modules in position.

Optionally, the PCB layer 131 comprises a plurality of PCB modules and/or the shield layer 132 comprises a plurality of shield modules. This way, all modules can be size matched to the distribution modules. This may facilitate assembly of the antenna arrangement. For example, in a 16×16 antenna array, a distribution module arranged to distribute radio signals to 8×8 radiation elements can be matched with a radiation module comprising 8×8 radiation elements and matched with a PCB module and a shield module with matching sizes. All modules may be attached together by bolts or the like. Alternatively, or in combination of, the frame 122 can be arranged to fix all modules in position.

Figure 5A:
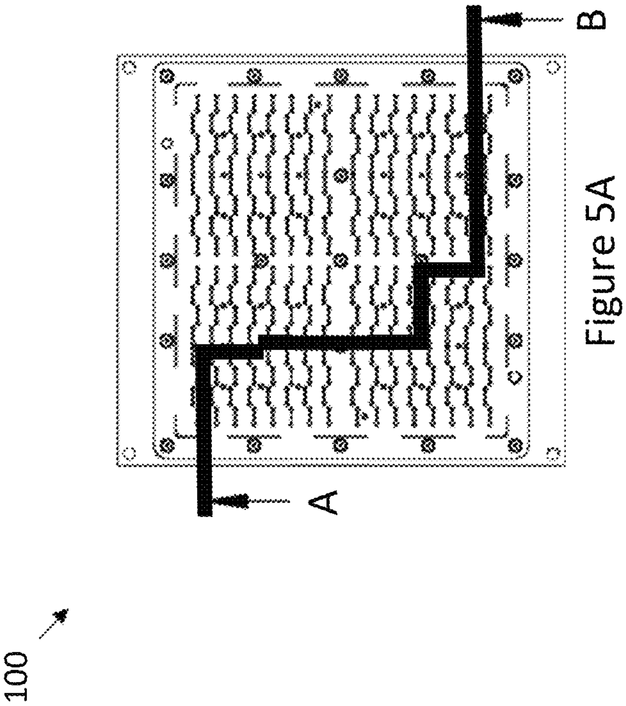
FIG. 5A shows a top view of an example antenna arrangement
Figure 5B:
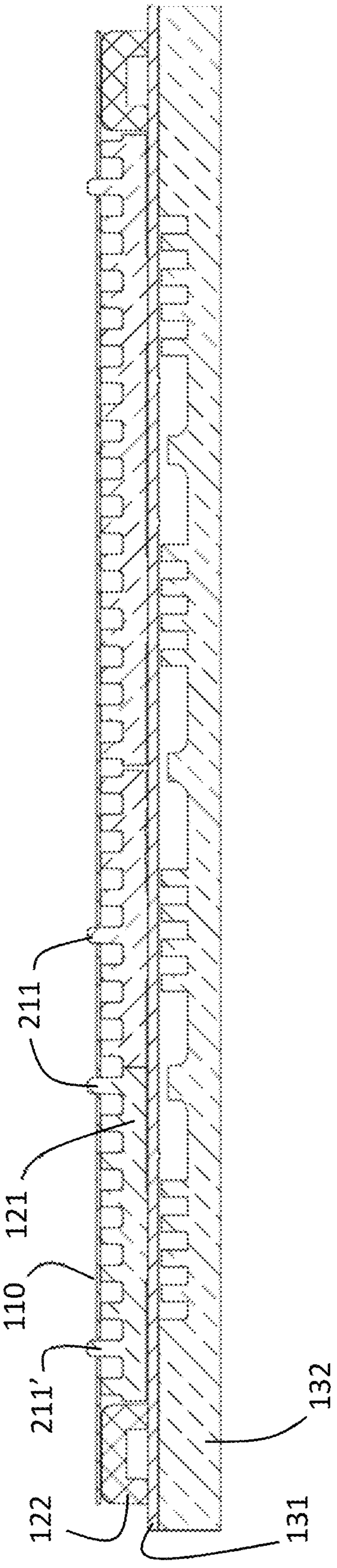
FIG. 5B shows a cross section view an example antenna arrangement.

FIG. 5A shows a top view of an example antenna arrangement. FIG. 5B shows a cross section view of the line A to B in FIG. 5A.

According to aspects, a telecommunication or radar transceiver comprises the antenna arrangement 100.

The invention claimed is:

1. An antenna arrangement having a stacked layered structure, the antenna arrangement comprising:
- a radiation layer comprising one or more radiation elements, and
- a distribution layer facing the radiation layer,
- wherein the distribution layer is arranged to distribute a radio frequency signal to the one or more radiation elements, the distribution layer comprising at least one distribution layer feed and a first electromagnetic bandgap, EBG, structure (324) arranged to form at least one first waveguide intermediate the distribution layer and the radiation layer, the first EBG structure also arranged to prevent electromagnetic radiation in a frequency band of operation from propagating from the at least one first wave guide in directions other than through the at least one distribution layer feed and the one or more radiation elements,
- wherein the distribution layer comprises a plurality of distribution modules and a positioning structure, wherein the positioning structure is arranged to fix the distribution modules in position.

2. The antenna arrangement according to claim 1, wherein the positioning structure comprises a frame.

3. The antenna arrangement according to claim 1, wherein at least one of the one or more radiation elements comprises an aperture.

4. The antenna arrangement according to claim 1, wherein the first EBG structure comprises a repetitive structure of protruding elements, and the distribution layer further comprises at least one waveguide ridge, thereby forming at least one first gap waveguide intermediate the distribution layer and the radiation layer.

5. The antenna arrangement claim 1 further comprising a support layer facing the distribution layer, the support layer arranged to support the positioning structure and/or the plurality of distribution modules.

6. The antenna arrangement according to claim 5, wherein the support layer comprises a printed circuit board, PCB, layer and a shield layer, wherein the PCB layer comprises at least one PCB layer feed, and wherein the PCB layer faces the distribution layer and the shield layer faces the PCB layer.

7. The antenna arrangement according to claim 6, wherein the shield layer comprises a second EBG structure arranged to form at least one second waveguide intermediate the shield layer and the PCB layer, the second EBG structure also arranged to prevent electromagnetic radiation in a frequency band of operation from propagating from the at least one second wave guide in directions other than through the at least one PCB layer feed.

8. The antenna arrangement according to claim 7, wherein the second EBG structure comprises a repetitive structure of protruding elements, and wherein the PCB layer comprises a ground plane and at least one planar transmission line, thereby forming at least one second gap waveguide intermediate the shield layer and the PCB layer.

9. The antenna arrangement according to claim 1, wherein the radiation layer comprises a plurality of radiation modules.

10. The antenna arrangement according to claim 6, wherein the PCB layer comprises a plurality of PCB modules.

11. The antenna arrangement according to claim 6, wherein the shield layer comprises a plurality of shield modules.

12. A telecommunication or radar transceiver comprising the antenna arrangement according to claim 1.

* * * * *